US009883034B2

(12) United States Patent
Zernik et al.

(10) Patent No.: US 9,883,034 B2
(45) Date of Patent: Jan. 30, 2018

(54) CALL CENTER ANALYTICAL SYSTEM HAVING REAL TIME CAPABILITIES

(75) Inventors: Dror Zernik, Haifa (IL); Moshe Avlagon, D.N. Hefer (IL); Hovav Lapidot, Manhattan, NY (US)

(73) Assignee: NICE LTD., Ra'anana (IL)

( * ) Notice: Subject to any disclaimer, the term of this patent is extended or adjusted under 35 U.S.C. 154(b) by 1744 days.

(21) Appl. No.: 12/300,494

(22) PCT Filed: May 15, 2007

(86) PCT No.: PCT/IL2007/000594
§ 371 (c)(1),
(2), (4) Date: Apr. 28, 2009

(87) PCT Pub. No.: WO2007/132467

PCT Pub. Date: Nov. 22, 2007

(65) Prior Publication Data

US 2010/0017263 A1  Jan. 21, 2010

Related U.S. Application Data

(60) Provisional application No. 60/800,530, filed on May 15, 2006.

(51) Int. Cl.
*G06Q 10/00* (2012.01)
*H04M 3/51* (2006.01)
*G06Q 30/02* (2012.01)

(52) U.S. Cl.
CPC .......... *H04M 3/5175* (2013.01); *G06Q 30/02* (2013.01); *G06Q 30/0202* (2013.01); *G06Q 30/0244* (2013.01)

(58) Field of Classification Search
CPC . G06C 30/02; G06C 30/0202; G06C 30/0244
(Continued)

(56) References Cited

U.S. PATENT DOCUMENTS 6,094,673 A * 7/2000 Dilip et al. ................... 709/202
6,327,363 B1 * 12/2001 Henderson et al. ..... 379/265.01
(Continued)

FOREIGN PATENT DOCUMENTS

DE  WO 2004/082252  *  9/2004  ............. H04M 3/51
WO  WO 2004/082252     9/2004

OTHER PUBLICATIONS

International preliminary report on patentability for corresponding PCT application (5 pages—dated Nov. 17, 2008).
(Continued)

*Primary Examiner* — Alan S Miller
*Assistant Examiner* — Folashade Anderson
(74) *Attorney, Agent, or Firm* — Pearl Cohen Zedek Latzer Baratz LLP (57) ABSTRACT

The present invention relates to a corporation call center system having real time capabilities, which comprises: (a) storage for at least a portion of the operational database of the corporation; (b) analysis module for analyzing the data of said storage, and forming model tables describing some selling and purchasing pattern of behavior as realized from prior knowledge, and model engine programs for operating with said model tables; (c) model engine programs for: (c.1.) initially, and in real time during a specific interaction with a customer, substituting real values relating to said specific interaction in said model tables, and determining respectively a most valuable parameter for the corporation or a ranking list of most valuable parameters which has to be obtained from said customer, and providing the same to a real time engine for introduction in real time to said customer; and (c.2.) upon receipt of real, value for said most valuable parameter from the customer, determining in real time by using said model tables a most attractive product or a ranking list of most attractive products, and conveying the
(Continued)

same to said real time engine for introduction as an offer to said customer; (d) a real time engine for: (d.1.) during said interaction of an agent with a specific customer, receiving from said model engine programs either said most valuable parameter for the corporation or said ranking list of most valuable parameters, and introducing the same as a real time message to the agent for questioning by the agent from the client a real value for the same, and upon receipt of said real value from said agent, conveying it to said model engine programs; (d.2.) receiving from said model engine programs an indication relating to a most attractive product or a ranking list of most attractive products, and initiating in real time a respective message to the agent notifying him to offer the customer one or more of said most attractive products.

20 Claims, 4 Drawing Sheets (58) Field of Classification Search
USPC .................................................. 705/7.36
See application file for complete search history.

(56) References Cited

U.S. PATENT DOCUMENTS

| | | | | |
|---|---|---|---|---|
| 6,959,080 | B2* | 10/2005 | Dezonno | H04M 3/523 379/265.07 |
| 7,216,087 | B2* | 5/2007 | Thompson et al. | 705/7.29 |
| 7,519,566 | B2* | 4/2009 | Prigogin et al. | 706/21 |
| 7,792,257 | B1* | 9/2010 | Vanier et al. | 379/114.13 |
| 7,950,925 | B2* | 5/2011 | McDaniel et al. | 434/377 |
| 7,962,361 | B2* | 6/2011 | Ramchandani et al. | 705/14.25 |
| 8,229,787 | B2* | 7/2012 | Ramchandani et al. | 705/14.25 |
| 8,355,934 | B2* | 1/2013 | Virdhagriswaran | 705/4 |
| 8,417,523 | B2* | 4/2013 | Wlasiuk | 704/235 |
| 9,020,920 | B1* | 4/2015 | Haggerty | G06F 17/30 707/705 |
| 2002/0046086 | A1* | 4/2002 | Pletz et al. | 705/14 |
| 2002/0062245 | A1* | 5/2002 | Niu et al. | 705/14 |
| 2002/0072974 | A1* | 6/2002 | Pugliese et al. | 705/14 |
| 2003/0200135 | A1* | 10/2003 | Wright | 705/10 |
| 2004/0238637 | A1* | 12/2004 | Russell et al. | 235/462.14 |
| 2005/0010472 | A1* | 1/2005 | Quatse et al. | 705/14 |
| 2005/0097000 | A1* | 5/2005 | Freishtat et al. | 705/26 |
| 2005/0165648 | A1 | 7/2005 | Razumov | |
| 2005/0209868 | A1* | 9/2005 | Wan et al. | 705/1 |
| 2006/0004622 | A1* | 1/2006 | Fanelli et al. | 705/10 |
| 2006/0123331 | A1* | 6/2006 | Hightower et al. | 715/505 |
| 2006/0250248 | A1* | 11/2006 | Tu et al. | 340/572.4 |
| 2006/0291644 | A1* | 12/2006 | Ellinwood et al. | 379/265.02 |
| 2007/0198325 | A1* | 8/2007 | Lyerly et al. | 705/10 |
| 2010/0223099 | A1* | 9/2010 | Johnson | G06Q 10/04 705/7.28 |

OTHER PUBLICATIONS

International Search Report for International Application No. PCT/IL07/00594 Dated May 9, 2007.

* cited by examiner

| Parameter | Contribution Percentage |
|---|---|
| Age | 11% |
| Beauty | 10% |
| Gender | 10% |
| Salary | 4% |
| Address | 2% |
| .... | |
| .... | |

$P_{k,1}$

| Parameter | Contribution Percentage |
|---|---|
| Age | 21% |
| Number of cars | 20% |
| Gender | 19% |
| Number of kids | 7% |
| Address | 6% |
| .... | |
| .... | |

$P_s$

| Parameter | Contribution Percentage |
|---|---|
| Gender | 15% |
| Age | 14% |
| Zip Code | 6% |
| .... | |
| | |
| .... | |
| .... | |

$P_{1,2}$

| Age | Rate of Purchase |
|---|---|
| 10-20 | 15% |
| 20-25 | 25% |
| 25-30 | 23% |
| 30-35 | 17% |
| 35-40 | 7% |
| .... | |
| .... | |

$P_{1,3}$

| Gender | Rate of Purchase |
|---|---|
| Male | 14% |
| Female | 8.6% |

CALL CENTER ANALYTICAL SYSTEM HAVING REAL TIME CAPABILITIES

CROSS-REFERENCE TO RELATED APPLICATIONS

This application claims priority from International Patent Application No. PCT/IL07/00594, entitled "CALL CENTER ANALYTICAL SYSTEM HAVING REAL TIME CAPABILITIES", international filing date May 15, 2007, published on Nov. 22, 2007 as WO/2007/132467, which in turn claims priority from U.S. Provisional Patent Application No. 60/800,530, filed May 15, 2006, all of which are incorporated herein by reference in their entirety.

FIELD OF THE INVENTION

The present invention relates to the field of Customer Relation Management in general, or more particularly to Customer Interaction Management. The present invention provides an agent, during the interaction with the customer and in real time, guidance for how to acquire from the customer, most important data for the company, and, based on the client response, the system, among other features, analyzes, in real time, said customer response data, and issues an offer to the customer to buy an additional product, which is most suitable to the customer, and having optimal business value for the organization.

BACKGROUND OF THE INVENTION

Customer interactions are precious moments for the company where an impact can be achieved. The use of call centers has become a key channel for managing corporate-to-customer relations. A call center allows for both 24×7 service and support, as well as for selling and marketing of the corporate products. Call centers have become an industry, which relies on hardware (switch boxes, computer-telephone interfaces) as well as software for managing the interactions with customers (CRM software). Since a major portion of the interactions between the company and its customers are carried out by the call center, analytical capabilities have been used to generate marketing and sale support services for the corporate agents. "Best offer" and "campaign management" modules, which use results of analytical models (some times commonly referred to as "data mining engines"), are commonly deployed. These engines are often used as static "recommendations". In the absence of real-time (that is, during the call, i.e., the discussion with the customer) data capabilities to manage interactions, and with lack of capability to modify and guide the agent's conversation scripts, there is no demand for immediate, tight loop improvement of these capabilities.

Figure 4:
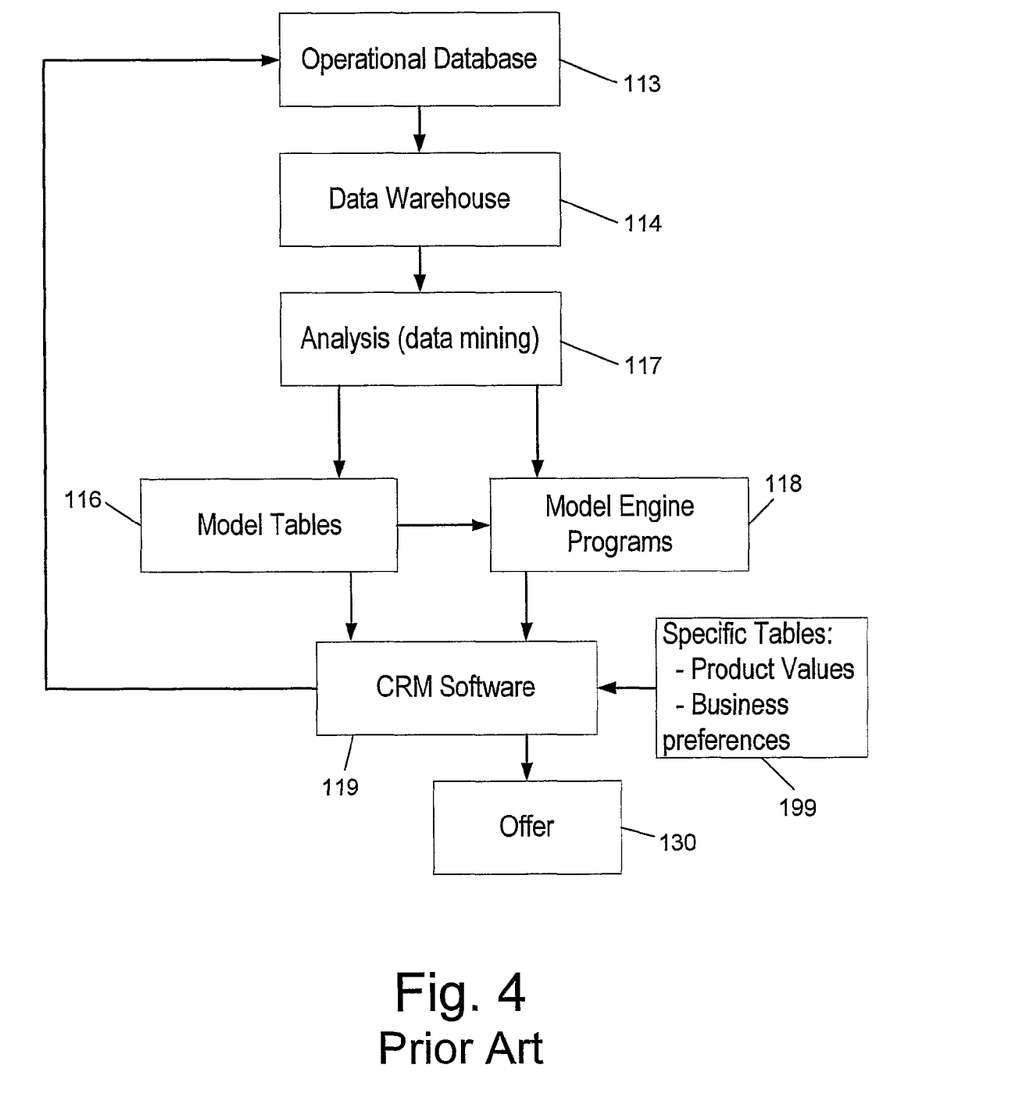
FIG. 4 illustrates the structure of a call center system according to the prior art.

Currently available analytical customer relation management (CRM) systems rely on pre-defined analysis of trends as well as of prior knowledge of each particular customer. Data-Mining engines analyze historical customer data, transactions and profiles, in order to generate statistical predictions as to customer preferences, needs, and expected responses. The more detailed the user profile and the customer history, and the larger the customer base, the more accurate the predictions can be. Nevertheless, almost always the operational CRM systems operate in an incomplete knowledge environment, as the profile of the customer interacting with the agent is incomplete. An additional aspect of these analytical tools (i.e., the data mining engines) is that as the computation of the analysis of the data-mining engines is time-consuming, these engines are typically initiated only once a period; during this initiation, the engines typically compute a static prediction for each customer in the customer database. This is demonstrated in FIG. 4, showing the prior art. New customers or changes during the period since the last data mining run, cannot be taken into account. Furthermore, for any new customer, a simulation has to be generated in order to determine his profile. Further, there is no pro-active attempt to gather more information during a current conversation of the agent with the customer in order to refine the prediction for that specific customer, according to the information missing from the customer's profile. Furthermore, as data mining is applied to the information that is enclosed within the CRM system, the models produced typically contain only information that is included in the system.

The model in the context of this application is a prediction mechanism: for example, given some key parameters of the customer, the model may return the likelihood that this customer will buy each of the company products. It should be noted herein that throughout this application, the term "products" refers also to services. Models contain information (that is, are used to predict) about customer likelihood to buy each specific product, about customer categorization, and about market trends.

Models can be implemented in two forms: as a set of tables, where one can look up an entry—and find the requested, predictive value, or as a program—which includes a user and interface. Upon entering the relevant parameters, and based on the model, the program returns the predictive values.

Data-Mining engines are based on statistical methods (mostly regressions). They use large volume data sets in order to form a statistical model. Typically these engines are used for creating association rules, categorization and clustering of populations, and for attribute selection. Data mining engines have been typically used for:
A. Targeted population access, in campaign management or even simply in best matching of products to customers;
B. Customer preservation purposes, based on specific customer profiles;
C. Anticipating marketing responses and loads;
D. Supporting "best-offer" activities, for example, cross-sell and up-sell activities within the call center interactions.

Typical prior art CRM environments are defined to reflect a fixed process. Accordingly, there is no pro-active attempt to gather more information in order to refine the prediction for each customer, based on data-mining needs, as information missing from the specific customer profile cannot be easily integrated into the predefined CRM processes. Further, as data mining is applied to the information that is enclosed within the CRM system, the models typically refer only to the information that is included and gathered by the predefined CRM system. Accordingly, information about specific calls, unstructured information, and additional information (e.g. agent related information, timing of processes) cannot be easily included in the model. Also, information that is not recorded in the CRM (for example, the customer refusal for an offer) cannot be used for future analysis of marketing trends.

All these usages can be applied statically by using the off-line capabilities of the Data-Mining engines. However, it has been found that a more accurate and continuous improvement can be obtained by tightly integrating the data mining model and the operational data with the run-time environment.

For the purpose of explaining the advantages of the present invention, let's examine a typical call center of an insurance company. Typically, insurance companies set the price of a car insurance using customer specific parameters. These parameters include information about the car, the drivers and their driving history, and the vehicle usage. In a typical case, there are many parameters of the drivers which may have an impact on the probability for a claim. Obviously, some of these parameters are well known, (e.g., the age, gender, driving experience, previous driving violations, and previous claims), and therefore it has become a de-facto standard in the insurance industry to use them while determining the policy price. Imagine, however, that in order to achieve competitive advantage, the marketing group within the insurance company wishes to better qualify customer profiles. For example, the marketing group may assume that there are several additional parameters, for example, P1 . . . Pk, that can more effectively predict the customer value. The company then faces two challenges: the first one is to rapidly modify the existing CRM environment and to build the business process to collect P1 . . . Pk. The second challenge is that once the mechanism for collecting, storing and analyzing this information is in place for new customers, the challenge is then how to gather this additional information also for the existing customers. It may require building special processes for completing the missing information.

It is vital to overcome this challenge for existing customers, as such an update of the additional parameters values $P_1 \ldots P_k$ for each existing customer would better predict the response of said customer for an up-sell offer. However, since said additional information is missing, the model that can be applied is only the old partial model.

The call center generally costs a huge amount of money to the company. The time which each agent spends with the customer is precious. If, however, the agent can sell to the customer one extra product, this may significantly increase the effectiveness of that agent, and will increase the company revenues. However, there is a problem that the agent faces: there are many parameters about the client that are available to the company (assuming that this is an existing client), and there are many more parameters that are unknown (particularly when the client is a new client). So, based on known specific customer parameters, the data mining engine may predict which of the company products has the highest probability that the client will buy. However, what if the current customer data lacks one vital parameter and therefore the model prediction cannot be accurate or cannot be generated at all? In such a case, there is first a need for the company to determine the most vital unknown parameter for the calling customer. Only then is it possible to select the "best product offer". The determination of the most vital parameter is important, as generally the client is impatient, and the call time is expensive. For a new customer who calls the first time, this is even a higher challenge, as there are many more missing parameters, some of which are not included in the standard, predefined CRM process.

In one aspect of the invention, the present invention guides the agent during the discussion with the customer to ask the customer said vital question, in order to determine, from the client, the missing parameter which is most vital to the company. Moreover, based on prior analysis, this question may depend on many parameters of the present call. For example, if a customer has called to discuss about product A of the company (which he has purchased before), it is important to know whether product B may be of interest for the customer. However, this may depend on the customer's age, in other cases on family status, in other cases, on the customer's number of children, and their ages, in other cases on the number of cars the family has, etc. So, as the agent cannot introduce a full questionnaire to the customer, there is a great need to obtain in real time a minimal, preferably one most vital parameter. But how can the agent determine in real time what is this missing most vital parameter? Moreover, how can the agent determine the missing parameter when this parameter depends on real time data relating to the present call (for example to the type of product A)? The present invention provides a tool for overcoming this real time complicated challenge.

Further, most typical CRM systems record only the transactions that were approved by the customer and carried out. In other words, when a customer refuses a suggested offer, the information regarding the refused offer is typically not recorded. This has two negative impacts:
1. The next time the customer calls, the same offer might be suggested to him and refused.
2. The data mining engine cannot use this additional information, i.e., the determination that this offer has already been turned down by "this type of customers", in order to improve its overall predictions.

By using the real time capabilities of the present invention, this refusal information is also recorded and stored for future analysis.

Furthermore, by providing the real time system of the invention, the determination of accurate situation identification and interaction control, such as, when during the call would it be most meaningful to provide an offer, becomes feasible.

It is therefore an object of the present invention to provide a mechanism for increasing the revenue per service or product agent interaction in a call center.

It is another object of the present invention to provide a real-time analytical means for improving the revenue at the whole call center.

It is also an object of the present invention to provide means for optimizing the gathering of information by the agents of a call center.

It is still another object of the present invention to provide means for closing the gap between the analytical tools (such as data mining engines) that are used today off-line, and the agent behavior in call centers, and to allow using insights about real-time data gathered during the present call in order to increase revenues.

It is still another object of the present invention to provide means for improving sale tactics and sale strategies in the call center.

It is still another object of the present invention to provide means for quick experimentation of business hypothesis within the call center, and validating the results of these experiments with analytical tools.

It is still another object of the present invention to provide a tool for quick shortcut construction in existing CRM processes, to ensure the information completion value of customer interactions. This is designed to overcome the CRM rigid process definition, which does not allow for shortcuts.

It is still another object of the present invention to provide means for dynamically ranking information collection priorities according to their value to the company, as derived by analytical tools.

It is still another object of the present invention to provide means for gathering the vital information from the customer independently of the conventional main operational system of the company, thus eliminating the risk of damaging the operational system performance, structure or access.

SUMMARY OF THE INVENTION

The present invention relates to a corporation call center system having real time capabilities, which comprises: (a) storage for at least a portion of the operational database of the corporation; (b) analysis module for analyzing the data of said storage, and forming model tables describing some selling and purchasing pattern of behavior as realized from prior knowledge, and model engine programs for operating with said model tables; (c) model engine programs for: (c.1.) initially, and in real time during a specific interaction with a customer, substituting real values relating to said specific interaction in said model tables, and determining respectively a most valuable parameter for the corporation or a ranking list of most valuable parameters which has to be obtained from said customer, and providing the same to a real time engine for introduction in real time to said customer; and (c.2.) upon receipt of real, value for said most valuable parameter from the customer, determining in real time by using said model tables a most attractive product or a ranking list of most attractive products, and conveying the same to said real time engine for introduction as an offer to said customer; (d) a real time engine for: (d.1.) during said interaction of an agent with a specific customer, receiving from said model engine programs either said most valuable parameter for the corporation or said ranking list of most valuable parameters, and introducing the same as a real time message to the agent for questioning by the agent from the client a real value for the same, and upon receipt of said real value from said agent, conveying it to said model engine programs; (d.2.) receiving from said model engine programs an indication relating to a most attractive product or a ranking list of most attractive products, and initiating in real time a respective message to the agent notifying him to offer the customer one or more of said most attractive products.

In one embodiment of the invention, said storage is a data warehouse, which is at least partially a copy of the corporate operational database, and wherein the data warehouse is periodically synchronized with the corporate database.

In another embodiment of the invention, said storage is the corporate operational database.

Preferably, the system further comprises specific tables that are connected to the real time engine, for providing filtering considerations for the list of most valuable parameters and the list of most attractive products.

Preferably, the system further comprises overriding rules for providing filtering considerations to the model engine programs for the list of most valuable parameters and the list of most attractive products.

Preferably, the real time messages sent from the real time engine to the agents are conveyed in a form of visual messages on the agents' displays.

Preferably, the real time messages from the real time engine to the agents are conveyed in a form of audible messages.

Preferably, the determination of the most valuable parameters and of the most attractive products depend on parameter values selected from: (a) parameters relating to the specific customer as obtained for said data warehouse; (b) parameters relating to the specific interaction; (c) parameters relating to the specific agent; (d) parameters relating to the time of the interaction (d) parameters relating to the duration of the interaction.

In still another embodiment of the invention, the system of the invention is used for testing of a business related hypothesis.

Preferably, the model engine programs further comprise retention or churn models, and they issue to the real time engine a probability of said customer to leave the corporation, and wherein said real time engine further notifies, if necessary, the agent accordingly. Preferably, the notification by the real time engine is a best action to be carried out by the agent.

DETAILED DESCRIPTION OF PREFERRED EMBODIMENT

As said, an important object of the present invention is to increase the efficiency, effectiveness and Quality of Service (QoS) of call center corporate agents, by providing them guidance in real time, based on real time information which is collected during the call with the customer, and analyzing this data. It should be noted that such a call may be initiated by an existing customer, may be initiated by the agent to an existing customer or to a potential customer, or may be held with a totally new customer about whom the company has no information whatsoever. The efficiency, effectiveness and QoS increase of the agent are improved by the present invention in several ways:

a. The present invention suggests a method for utilizing data mining models, and then guiding the agent in real time regarding which information is most valuable to the company in order to determine the product which is most attractive for the specific call. "Attractive" refers to the product which has the highest probability to be purchased by the customer, the selling of which is most valuable to the company, that most abides with the corporate business interest, or a combination thereof. More particularly, the present invention determines and indicates the agent to collect from the customer the one or more, preferably very few parameters (for example, two or three) that are most valuable to the company in order to determine the most attractive product(s).
  b. Having acquired from the customer said most valuable parameters, the present invention analyzes, and then determines and provides to the agent in real time guidance to offer the customer said most attractive product. It should be noted that there may be various parameters that this determination may depend on, and some of them may be determined only during the call. Further, note that the most attractive product is not necessarily the product with the highest expected value for the company. Many additional business considerations may contribute to this decision.
  c. The invention may further provide to the agent other types of real time guidance, such as when, during the call to provide the offer, and in what manner, based on real time information that is gathered from the customer, or from previous experience of the company regarding interactions with customers, and specifically information describing the real time nature of the interactions.

In another aspect, the invention collects business and real time parameters of each interaction which are not included in the core of the prior art CRM applications, and therefore is not a part of the operational database of the organization.

FIG. 4 is a block diagram illustrating the prior art manner of using analytical tools for supporting CRM activities. The operational database 113 is used for constructing a data warehouse 114. From this data warehouse the analysis engines 117 construct the models engines and tables (116, and 118), which are used by the CRM software 119 to generate the best offer 130, using special tables 199. The CRM software manages the operational database; it is actually the process that guides the call center agents, how to insert consistent information into this database.

Figure 1:
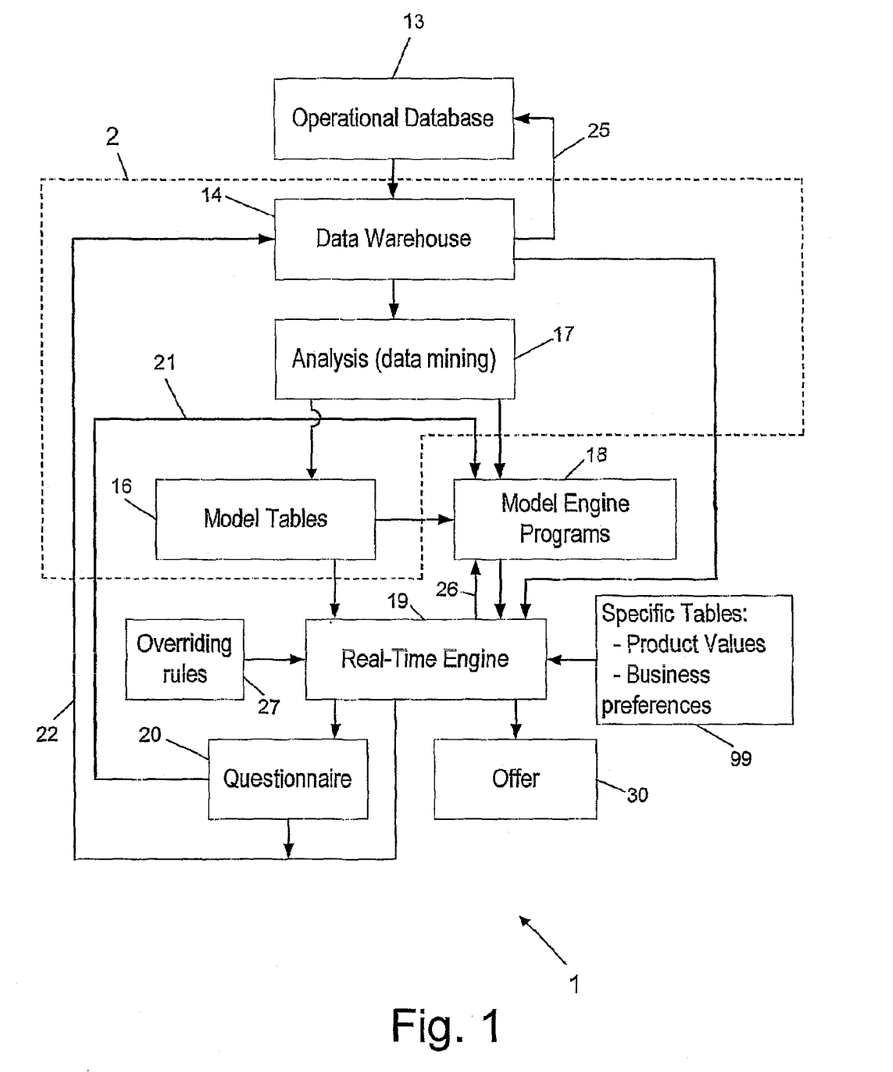
FIG. 1 illustrates the structure of the call center real time system according to an embodiment of the present invention.

Reference is now made to FIG. 1 which describes the real time system 1 of the invention in a flow diagram form. The dotted box 2 of system 1 indicates the portion of the system which operates off-line. All the other portions of system 1 operate in real time. The operational Database 13 is the corporate conventional database which is used by the company for all its ongoing operation needs. In view of the fact that the integrity of this operational database 13 is critical for the daily and continuous operation of the company, and in view of the fact that the system of the present invention does not necessarily need all the data within said operational database, and furthermore, as the data which the real time portion of the system of the present invention needs from the operational database does not necessarily have to be updated to the moment, the present invention preferably uses a sub-copy of the operational database (i.e., such as a data warehouse 14). The data warehouse 14 is essentially a copy of all, or preferably only a relevant portion of database 13. Said warehouse copy may be updated periodically from the operational database, for example, once a month. As will become clear hereinafter, such a separation provides some additional flexibility advantages to the system, as some of the parameters which the real time portion of the system deals with, may be found irrelevant to the operational database 13. In one aspect of the invention, the warehouse 14 may be viewed as a single, flat table of the operational database 13. It generally contains aggregate values representing multiple transactions and data of the operational database. A more refined differentiation of the sub-database copy and the classical data-warehouse are described in FIG. 2.

From the data warehouse 14, the model tables 16 and the model engine programs 18 are prepared. Said model tables are a collection of one or more model tables. The model tables 16 are formed based on the results of the statistical analysis 17. Said tables, based on prior information, reflect some behavior patterns and predictions. The model tables 16 are prepared by means of analyzing 17 the warehouse data and determining from said data some patterns of behavior, as is commonly the case with data mining tools.

Figure 3:
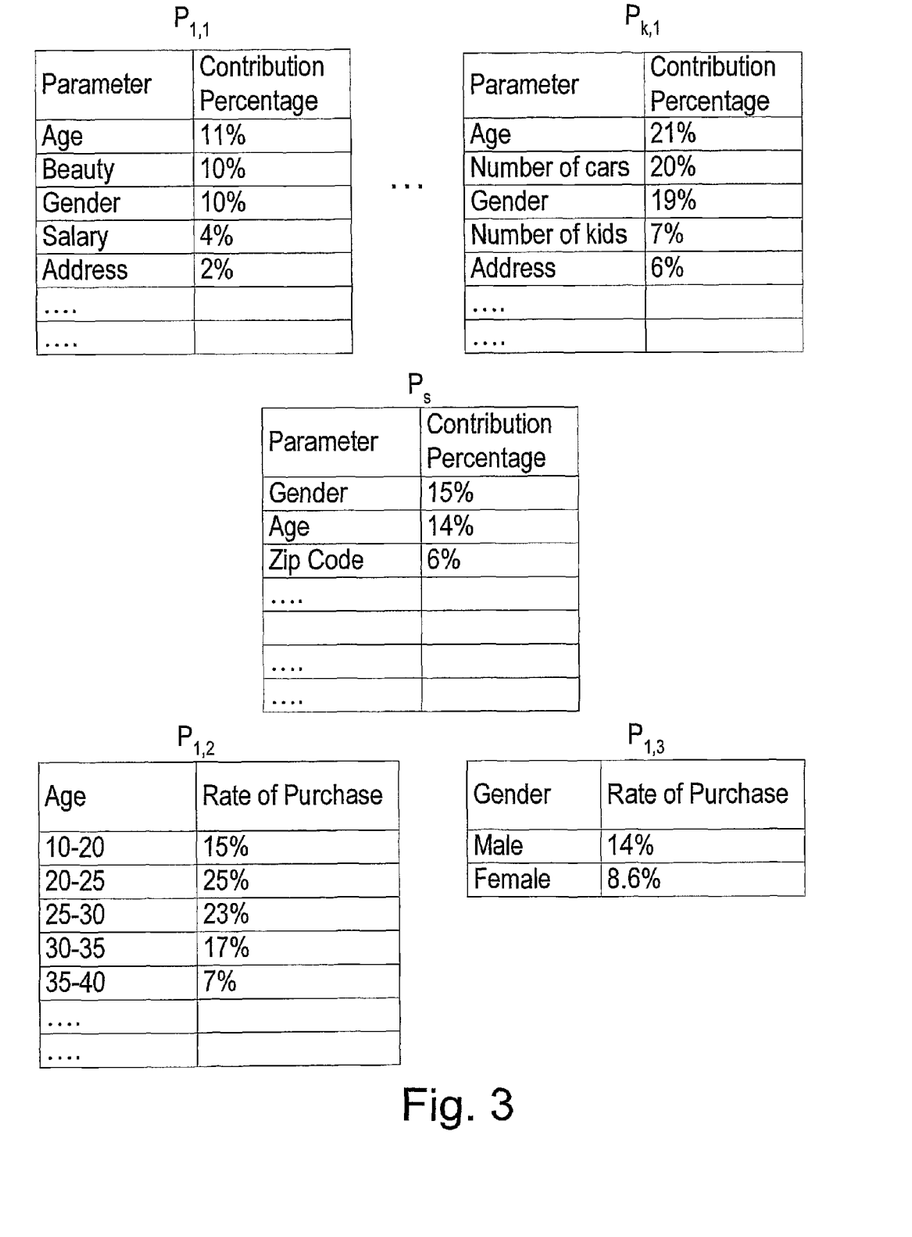
FIG. 3 shows some exemplary tables of the model according to an embodiment of the present invention.

A more detailed exemplary view of the model tables is provided in FIG. 3, where some examples for the possible model tables are shown. For example, these tables may include tables $P_{1,1}$-$P_{k,1}$, each describing prior behavior relating respectively to products $P_1$-$P_k$, in terms of several parameters. The exemplary table $P_{1,1}$ indicates that the most important customer parameter, i.e., the parameter which contributes most to whether the customer will buy product $P_1$ or not is the customer's age, as the value of this parameter indicates that 11% of the cases in which product $P_1$ was bought have been found to relate to customer age. More particularly, this parameter was found to be most predictive for purchasing product $P_1$. Similarly, the beauty and gender were found to be of lesser indicative value, i.e., they only account for 10% of the cases in which product $P_1$ was bought. An additional table for product $P_1$ may be the table $P_{1,2}$. Such a table determines the probability that a person in a specific range of ages will buy the product. Still another table for product 1 may relate to the gender, such as table $P_{1,3}$, which indicates the distribution between the genders of customers who bought the product. The above tables are only examples, and additional tables may be included in the model, for each product, and for each parameter (age, beauty, gender, etc.). Still another table, which does not exist in prior art model tables, is a summary table such as table $P_s$ that summarizes the amount of information gained by acquiring the data corresponding to each parameter. In the example of table $P_s$, the most important parameter is the customer gender, and this is found to be "the most valuable parameter" that will be most preferable by the system to determine first. Alternatively, if this parameter is already known for a specific customer, the next parameter in the list, i.e., the customer age, will be regarded as "the most valuable parameter" for that specific customer.

During a specific call (i.e., a specific interaction with a specific customer), and given said determination of the one or more "most valuable parameters" for that specific customer, said one or more "most valuable parameters" for this customer are reported by the model engine programs 18 to the real time engine 19 (of FIG. 1).

Back to FIG. 1, the real time engine 19 is capable (among other features) of producing real time guidance instructions to the agent. Said guidance instructions may be real-time scripts such as: "Ask the client how old he is", "Determine the client gender", "Ask for the customer zip code", "Offer the client to buy product $P_1$", "Offer the client to buy life insurance policy", etc. According to the present invention, after a real time determination of the "most valuable parameter/s" by the model engine programs 18, a corresponding report regarding to the "most valuable parameter/s", as found, is conveyed to the real time engine 19, which in turn creates a request for information completion, which is a real time message to the agent such as one of the following: "Ask the client for his age", "Determine the client gender", "Ask for the customer zip code", "Determine the number of kids the customer has" . . . etc. Said real time message 20 (also referred to herein as questionnaire, which at this stage is empty from parameter values) is conveyed to the agent, for example in a form of a script that is displayed on the agent screen. In one example, the script is displayed in a form of "pop-up balloons". The pop-up balloon includes an appropriate questionnaire which is presented to the agent on his screen, already with the appropriate question/s drafted (of course, based on the "most valuable parameters" determination), and ready to receive the client response, i.e., the values corresponding to the parameters of the questionnaire.

In another example, the message may be a voice message that will be conveyed to the agent earphones (of course in a manner that will not be heard by the customer).

Upon acquiring by the agent from the client of the missing one or more values for the one or more "most valuable parameters", the values are typed in the questionnaire 20, and submitted 21 by the real-time engine to the model engine programs 18, through the process 26. The model engine programs 18 interacts in real time again with the model tables 16 and upon substitution of the previously missing values for the "most valuable parameter/s", the model engine programs 18 analyze and determine in real time the one product which the customer will most likely be willing to buy, i.e., the "most valuable product" or a list of products "most valuable products" ranked by their probability to be purchased by the client. Said one product, or optionally said ranked list are submitted to the real time engine 19, which in turn guides in real time the agent to offer 30 these one or more ranked "most valuable products" to the customer.

The real time engine 19 manages the activation of the model engine programs 18. This is done by calling the model engine programs 18 through process 26. In this call, the real time parameters relating to the customer, the call (i.e., the interaction with the customer) and the agent are transferred in real time to the model engine programs 18. This allows for much more refined models than in existed prior art call center systems.

Simultaneously with the submission of a request for evaluation to the model engine programs 18 (for example, to determine the "most valuable product"), the real time engine 19 also submits 22 the acquired questionnaire 20 data for saving it in the data warehouse 14 for future use. This allows for saving in warehouse 14 the valuable parameters relating to the call, or as acquired, for future analysis. Further, for newly acquired information, the organization may construct a process 25 of returning selected items from the data stored in warehouse 14 to the operational database 13.

The real time engine 19, upon receipt of said "most valuable product" i.e., the product that is most likely to be bought by the customer, or said ranking list, may apply additional rules such as overriding rules 27, and/or specific tables 99 which may contain product values (such as in $US) or business preferences, for example in weight for each preference, and determine the final one most attractive product, or said final ranking list, hereinafter referred to as Offer 30. The result from real time engine 19, considering said specific tables 99 or said overriding rules 27, may differ from the original product or list as produced by the model engine programs 18, in view of applying said rules 27, or specific tables 99.

This determination of the one product, optionally after applying said overriding rules 27 and/or said specific tables 99, defines the "most attractive product" which is finally offered to the customer. Optionally, as said the determination may produce a list of ranked "most attractive products". The one "most attractive product", or said list are presented to the agent in real time. Said message is conveyed to the agent in real time in a manner similar to the ones as described before (i.e., display, voice, etc.).

It should be noted that the overriding rules 27 may be, for example:
  a) Product cross-relation: For example, if the customer called regarding his life insurance ($P_7$) policy, he may most probably be interested in buying home insurance ($P_{34}$); or
  b) Already refused to previous offer: If this specific client already turned down a previous offer for $P_{27}$, offer him the next ranked product from the "most attractive product" list as determined.
  c) Agent skills: There may be agents having more skills in selling type A products than in selling type B products of the company. So, do not guide Agent n to offer type B products; etc.
  d) Who initiated the call and why: For example, if the call was initiated by the client, do not offer type B products, or if it is a complaint call which was not properly resolved, offer him a discounted product C;
  e) Special customers: For specific customers, such as customers for preservation or high risk customers, corresponding special rules may be applied.

As said, the present invention enables the real time determination and offer of a most attractive product, optionally, an extra product to the one requested by the customer. The accuracy of the determination is significantly increased in view of the real time determination and receipt from the client of the values for "most valuable parameters", and optionally by using overriding rules relevant to him. All these become feasible in real time by the system of the present invention.

In still another aspect of the present invention, the overriding rules may include presentation rules. These rules may determine when, how, and in what tactic to present the questionnaire or to offer the product to the customer. For example, there may be a determination that it is preferable that the agent will convey a message to the client at a period T after the beginning of the interaction.

Preferably, according to the present invention all the questionnaire data that is acquired from the client, and the summary of the interaction with the client, even if the offer was refused, is stored within the data warehouse 14. Such accumulated questionnaire data, which, as said, includes very valuable information, may be used for updating the model tables 16 and/or the model engine programs 18, or for obtaining more accurate models.

As said, preferably, even information regarding refused offers are saved, and optionally, also those reasons for the agent leading him to ignore the proposed guidance provided by the real time engine 19. Furthermore, said information may also be used by the company in the future.

In another aspect, the present invention also enables the efficient checking and testing of a business related hypothesis. For example, a hypothesis is introduced to an insurance company by its marketing group, that people who have pets, drive more carefully. In the systems of the prior art, the investigation of such a hypothesis requires a modification of the operational database and its adaptation to receive data acquired from customers regarding pet ownership. Further, a modification is also required to the CRM application. Such a change is complicated. Moreover, and if the hypothesis is eventually found to be false, the entire list of modifications should be reversed. According to the present invention this hypothesis is checked in a much more efficient way. In the present invention, the accumulated questionnaire data is saved in the data warehouse 14. Only when the data is found to be relevant, the operational database 13 is modified to accept this data, and the data is transferred via 25 to the operational database 13. Therefore, in such a case, the operational database is not unnecessarily updated unless a final confirmation for such update is provided.

Figure 2:
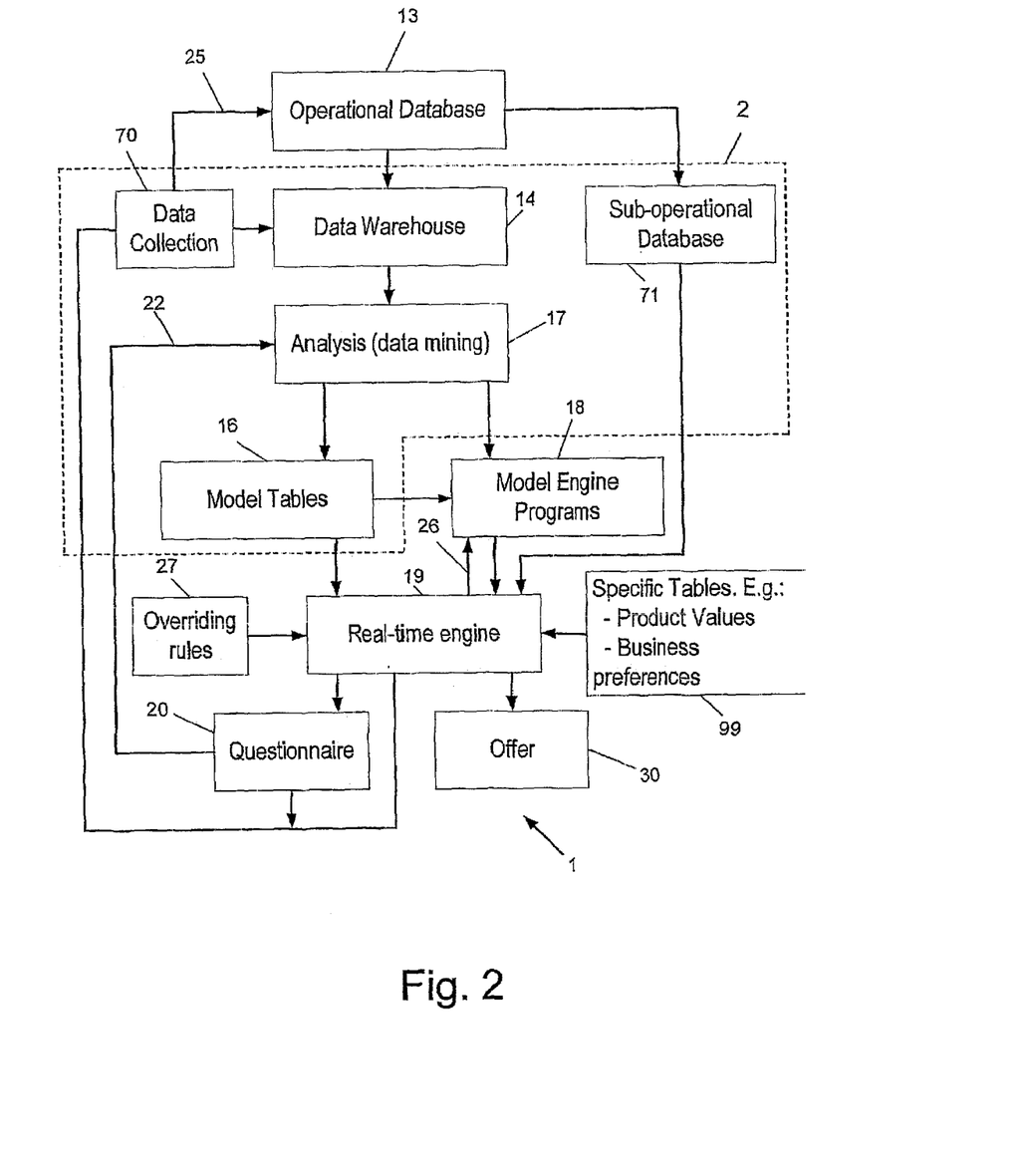
FIG. 2 illustrates the structure of the call center real time system according to another embodiment of the present invention.

FIG. 2 is similar to FIG. 1, except for the separation of the functions provided by the data warehouse 14. In this figure, the data warehouse 14 is split into three databases:
  a sub-operational database 71, which is used to store portions of the operational database 13 which are required by the real-time engine 19;
  The data gathered from the questionnaires, and the various responses, and the information describing the real-time nature of the interactions—all said items are collected in the data-collection database 70. Operational data is selectively picked from this database 70 and periodically transferred 25 to the operational database 13.

The core data-warehouse services—which are aggregates and samples from the operational database 13, and are required for constructing the models, are still stored in data warehouse 14.

The system as described so far provides to the real time engine one or more of "most valuable parameters" or "most valuable products". The same system can also be used for other model purposes such as retention and churn, which are models which predict the rate of loyalty of the customer to the company. In that case, the model engine programs 18 issue and convey to the real time engine 19 the probability of the customer to stay or to leave the company. The real time engine, in turn, evaluates using the overriding rules 27 which message 30 to send to the agent.

As shown, the present invention provides a real time system which introduces a very short questionnaire which is most appropriate to the specific client, receives a response from the client, analyzes in real time the received client response to the questionnaire together with the prior knowledge about the client and model tables, and issues guidance to the agent to offer the client a most valuable product. The system of the present invention performs this process in real time, and almost entirely in an automatic manner. The system of the present invention therefore provides the agent with a valuable real time tool to increase the company income.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for offering products to customers of a call center, implemented in a customer relation management (CRM) system, the method comprising:
    receiving, during a specific interaction between a customer and a call center agent, one or more interaction-specific parameters values;
    during the interaction, determining by a data-mining model engine based on statistical methods, one or more selected parameters for which a value associated with the customer is not stored in the CRM system, using data stored in model tables that rank customer parameters according to relative contribution to purchasing of a plurality of products, wherein the model tables are formed based on results of statistical analysis;
    sending instructions to the call center agent to obtain from the customer, one or more customer-specific values for the one or more selected parameters, for which a value associated with the customer is not stored in the CRM system and receiving from the call center agent the one or more customer-specific values by the model engine;
    during the interaction, choosing by the data-mining model engine based on statistical methods, one or more of the plurality of products as a selected product using the model tables, the stored data and the one or more customer-specific values for the one or more selected parameters; and
    during the interaction, sending instructions to the call center agent to suggest the selected product as on offer to the customer.

2. The method of claim 1, wherein the instructions to the call center agent are in the form of visual messages displayed on an agent screen.

3. The method of claim 1, wherein the instructions to the call center agent are in the form of voice messages.

4. The method of claim 1, wherein determining the one or more selected parameters is based at least on parameters relating to the specific interaction, parameters relating to the call center agent or both.

5. The method of claim 1, wherein determining the one or more selected products is based at least on parameters relating to the specific interaction, parameters relating to the call center agent or both.

6. The method of claim 1, wherein the one or more customer-specific values and additional interaction-specific values are used to determine the selected product.

7. The method of claim 1, wherein the one or more selected products are products that are predicted to have a highest probability to be purchased by the customer.

8. The method of claim 1, wherein the model tables include product model tables, each corresponding to one of the products and a summary table, wherein the one or more selected parameters are ranked at the top of the summary table as contributing most to a model predicting which of the products have a highest probability to be purchased by the customer.

9. The method of claim 1, comprising applying overriding rules that override rules that are associated with the model tables.

10. The method of claim 1, further comprising:
    applying a retention model, during the interaction to predict a probability of the customer to leave a corporation associated with the call center; and
    sending a notification to the call center agent based on the retention model.

11. A system for offering products to customers of a call center, implemented in a customer relation management (CRM) system, the system comprising:
    a storage to store CRM data:
    a data-mining model engine that analyzes the CRM data based on statistical methods and forms model tables that rank customer parameters according to relative contribution to purchasing of a plurality of products based on results of statistical analysis; and
    a real-time engine;
    wherein the data-mining model engine receives, during a specific interaction between a customer and a call center agent, one or more interaction-specific parameters values and determines, based on data stored in the model tables, one or more selected parameters for which a value associated with the customer is not stored in the CRM system,
    wherein the real-time engine send instructions to the call center agent to obtain from the customer, one or more customer-specific values for the one or more selected parameters for which a value associated with the customer is not stored in the CRM system,
    wherein during the interaction, upon receipt of the one or more customer-specific values from the call center agent, model engine chooses using the model tables, the stored data and the customer-specific value for the selected parameter, one or more of the plurality of products as a selected product, and
    during the interaction, the real-time engine sends instructions to the call center agent to suggest the selected product as on offer to the customer.

12. The system of claim 11, wherein the instructions to the call center agent are in the form of visual messages displayed on an agent screen.

13. The system of claim 11, wherein the instructions to the call center agent are in the form of voice messages.

14. The system of claim 11, wherein determining the one or more selected parameters is based at least on parameters relating to the specific interaction, parameters relating to the call center agent or both.

15. The system of claim 11, wherein determining the one or more selected products is based at least on one of: parameters relating to the specific interaction, parameters relating to the call center agent or both.

16. The system of claim 11, wherein the one or more customer-specific values and additional interaction-specific values are used to determine the selected product.

17. The system of claim 11, wherein the one or more selected product are products that are predicted to have a highest probability to be purchased by the customer.

18. The system of claim 11, wherein the model tables include product model tables, each corresponding to one of the products and a summary table, wherein the one or more selected parameters are ranked at the top of the summary table as contributing most to a model predicting which of the products have a highest probability to be purchased by the customer.

19. The system of claim 11, wherein the real-time engine applies overriding rules that override rules that are associated with the model tables.

20. The system of claim 11, wherein the system is to:
    apply a retention model, during the interaction, to predict a probability of the customer to leave a corporation associated with the call center; and
    send a notification to the call center agent based on the retention model.

\* \* \* \* \*